United States Patent [19]

Sullivan

[11] 4,375,193
[45] Mar. 1, 1983

[54] MONORAIL GUIDEWAY ASSEMBLY

[75] Inventor: Donald P. Sullivan, Burnsville, Minn.

[73] Assignee: Universal Mobility, Inc., Salt Lake City, Utah

[21] Appl. No.: 154,334

[22] Filed: May 29, 1980

[51] Int. Cl.³ .............................................. B61B 13/04
[52] U.S. Cl. ..................................... 104/118; 104/89; 105/141; 191/45 A; 191/30
[58] Field of Search ........................ 104/89, 90, 94, 95, 104/118, 119, 120, 121, 123; 191/45 R, 45 A, 30, 31; 105/141

[56] References Cited

U.S. PATENT DOCUMENTS 3,749,858 7/1973 Payen .................................. 191/45 R
3,786,204 1/1974 Laurent ................................. 191/45

Primary Examiner—Richard A. Bertsch
Attorney, Agent, or Firm—H. Ross Workman; Rick D. Nydegger; Dale E. Hulse

[57] ABSTRACT

An improved monorail guideway assembly including unencumbered running surfaces that are supported by a truss. Electrical bus bars are attached to the underside of the running surfaces and a protective skirt is attached to the edges of the running surfaces along their entire length. The skirt is bent so as to form a smoothly curved shoulder that shields the bus bars and guideway surface from snow or rain.

9 Claims, 5 Drawing Figures

MONORAIL GUIDEWAY ASSEMBLY

BACKGROUND

1. Field of the Invention

The present invention relates to a lightweight continuous guideway assembly for use in an automated guideway transit (AGT) system.

2. The Prior Art

Elevated monorail trains are becoming a popular, efficient and environmentally clean method of automated mass transportation, and are potentially a significant factor in energy conservation. In general, guideway assemblies for monorail trains are made from fabricated cast concrete or rolled steel sections of uniform length, weight, and structural strength. Generally, center grooves or troughs are cast in the running surface of the concrete tracks to provide surfaces along which guide wheels of the monorail train may run. These troughs accumulate water, ice, and debris and must periodically be cleaned.

Bus bars which extend along the sides of the guideway assembly comprise control rails and power rails for supplying electrical power and control signals to the AGT vehicles adapted to travel along the guideway assembly. These bus bars are generally exposed to weather conditions, and are often subject to the formation of ice and collection of snow in cold weather areas, often with resulting decreases in reliability of performance.

In view of the foregoing problems, an improved monorail guideway assembly is needed. A smooth ride should be derived from the running surface of the guideway. Electrical conduits and bus bars should be protected from the direct effects of weather, and should be easily accessible for maintenance. The guideway assembly should also be designed to discourage the collection or formation of ice or snow upon the running surfaces and electrical bus bars. Such an improved guideway assembly is disclosed herein.

BRIEF SUMMARY AND OBJECTS OF THE INVENTION

The present invention is an inexpensive, strong and light-weight guideway assembly for monorail vehicles. The guideway assembly is selectively reinforceable on site to obtain proper fit with support columns and to obtain adequate structural strength. The guideway assembly comprises smooth running and control surfaces with no grooves or channels on their outer surfaces, thus discouraging collection of ice or snow. A hollow interior is provided for protection of electrical conduits or the like, and a protective skirt extends along the entire length of both running surface edges, providing weather protection for guide wheel contact surface, electrical bus bars and encouraging laminar air flow across the running surfaces so as to prevent accumulations of snow thereon.

It is therefore a primary object of the present invention to provide an improved monorail guideway assembly for AGT systems.

It is another object of this invention to provide an improved monorail guideway assembly which has structural integrity and yet has reduced overall mass.

It is another object of this invention to provide an improved monorail guideway assembly which presents a smooth riding surface for an AGT vehicle.

Another object of this invention is to provide an improved guideway assembly presenting a sheltered guideway surface.

Another object of this invention is to provide an improved monorail guideway assembly in which all conduit is both protected and accessible.

It is still another object of this invention to provide an improved monorail guideway assembly which discourages the collection of ice or snow upon exterior running surfaces.

A further object of this invention is to provide an improved monorail guideway assembly in which the electrical power and control signal bus bars are protected from the weather.

These and other objects and features of the present invention will become more fully apparent from the following description and appended claims taken in conjunction with the accompanying drawings.

DETAILED DESCRIPTION OF THE PREFERRED EMBODIMENT

The invention is best understood by reference to the figures wherein like parts are designated with like numerals throughout.

Figure 1:
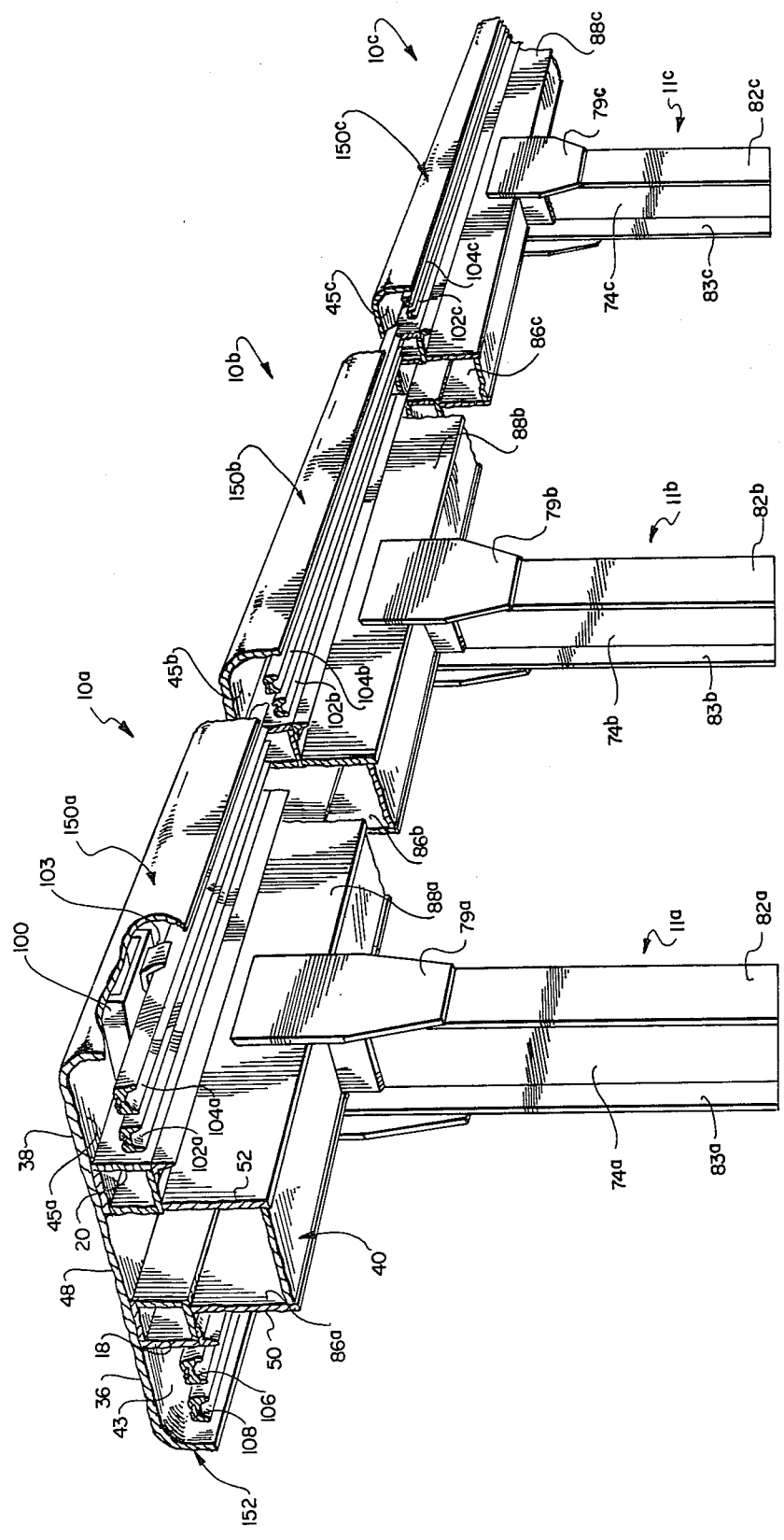
FIG. 1 is a fragmentary perspective view of one presently preferred monorail guideway assembly of the present invention.

FIG. 1 illustrates a preferred monorail guideway assembly embodiment generally designated 10 and mounted upon vertical support columns generally designated 11. Certain aspects of the guideway are described in copending application Ser. No. 932,828 filed Aug. 11, 1978. In the illustrated embodiment, the guideway assembly 10 is shown elevated from ground level. The present invention contemplates supporting the guideway assembly 10 at the ground level, above ground level, or spanning ground supporting structure. Columns 11 typically are of steel wide flange construction having central body members 74 and laterally extending flanges 82 and 83. Conventionally, the columns 11 for supporting the guideway assembly 10 are engineered to be spaced a predetermined distance apart, depending, among other things, upon site conditions, expected loads and length of track.

Figure 2:
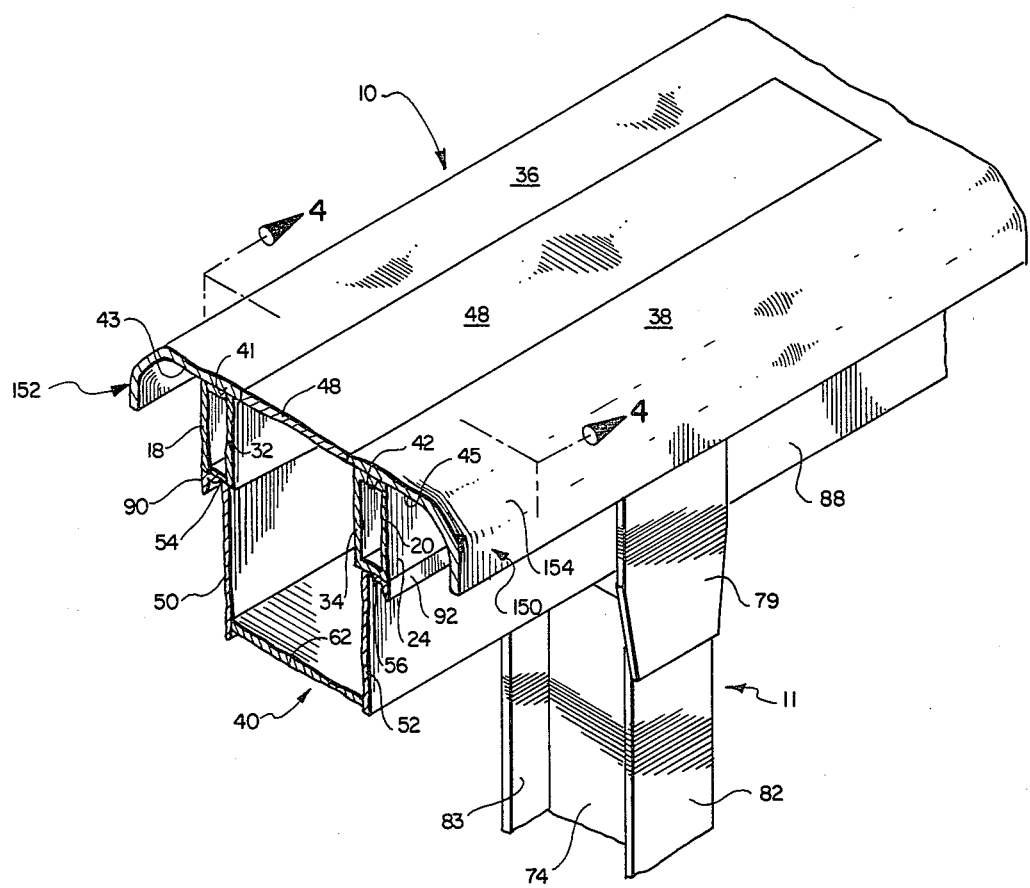
FIG. 2 is an enlarged perspective view of a portion of the guideway assembly.
Figure 4:
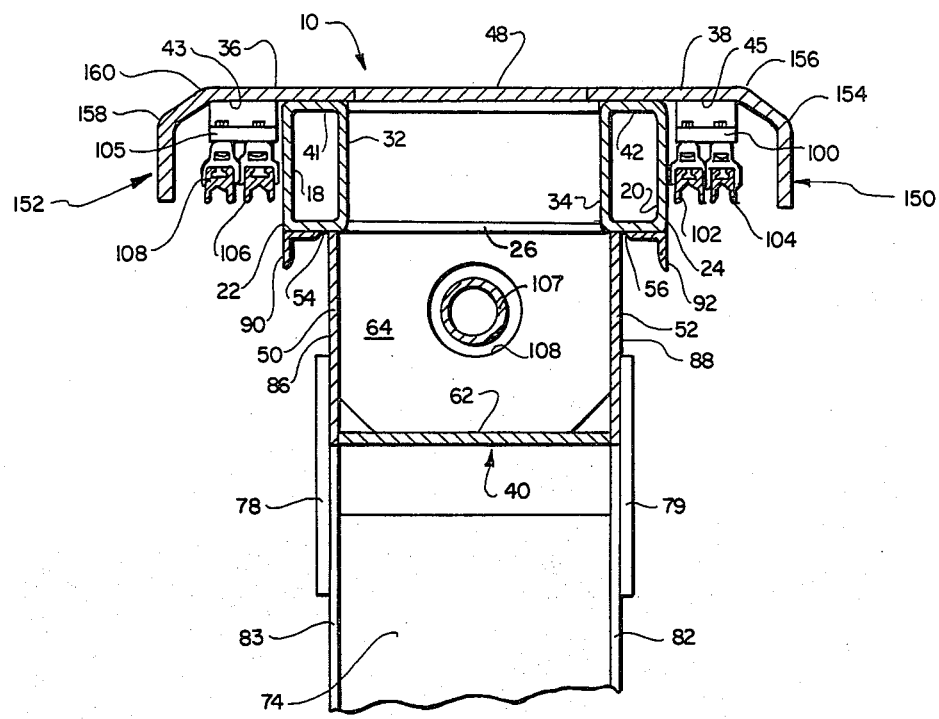
FIG. 4 is a cross-sectional view taken along lines 4—4 of FIG. 2.

Referring more particularly to FIGS. 2 and 4, the present embodiment of the guideway assembly 10 is illustrated as having three principal components, namely, running surfaces 36 and 38, beams 18 and 20, and truss 40. Running surfaces 36 and 38 are preferably constructed of plate steel and are in the form of continuous tracks. Running surfaces 36 and 38 are normally coplanar and parallel. The smooth running surfaces 36 and 38 permit the support wheels of the AGT vehicle (not shown) to traverse the guideway assembly quietly and safely.

Running surfaces 36 and 38 are rigidly mounted upon corresponding parallel support beams 18 and 20. Beams 18 and 20 are coextensive with running surfaces 36 and 38 and give structural support thereto. Typically the running surfaces 36 and 38 are welded at their lower sides 41 and 42 or are otherwise suitably joined to the upper side of beams 18 and 20. It is pointed out that the beams 18 and 20 are inset from the exterior edges of the running surfaces 36 and 38 so as to define rail overhangs 43 and 45, for purposes to be hereinafter described in more detail.

The exterior sides 22 and 24 of the beams 18 and 20 are essentially perpendicular to the plane of the running surfaces 36 and 38. Sides 22 and 24 provide a running surface for the control wheels of the AGT vehicle (not shown), and may be extended by attaching extension members 90 and 92 to the lower edge of beams 18 and 20.

Figure 3:
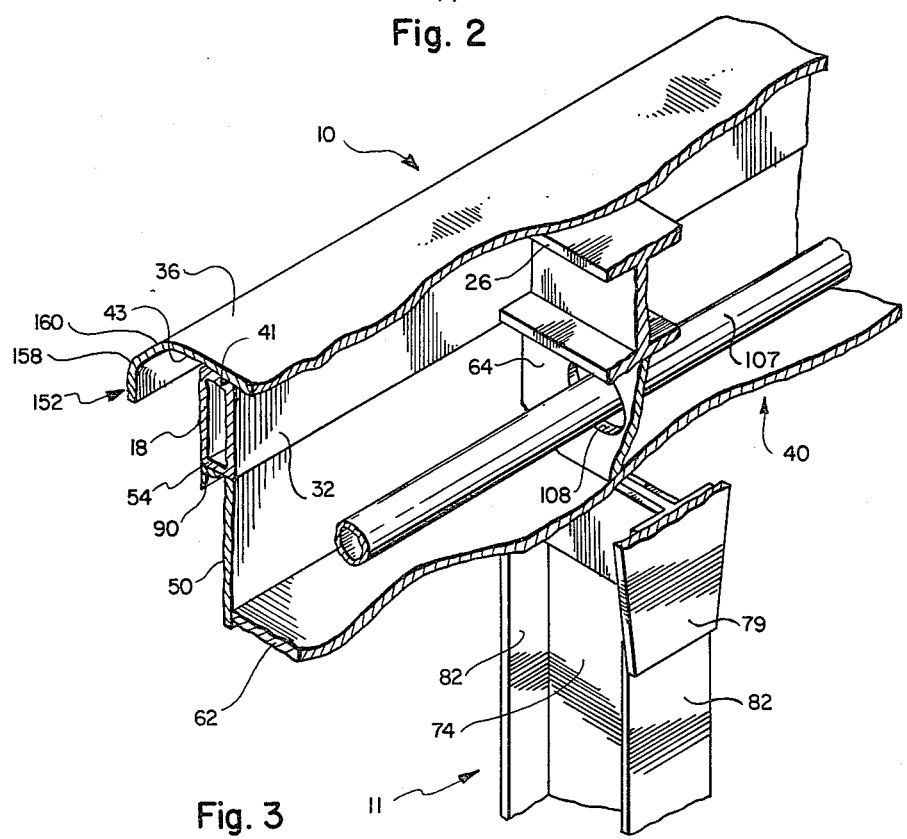
FIG. 3 is a fragmentary perspective illustration of the guideway assembly of FIG. 2 with portions broken away to reveal interior construction.

Referring to FIGS. 3 and 4, the spacing between the beams 8 and 20 is maintained by a plurality of tie bars 26 which are welded or otherwise suitably secured between the interior sides 32 and 34 of beams 18 and 20. The tie bars 26 are of I-beam or wide flange construction.

Running surfaces 36 and 38 and the underlying beams 18 and 20, respectively, are structurally supported by a truss 40. The truss 40 is shown as rectangular in cross section although circular or other suitable configurations could be used. In the illustrated embodiment, truss 40 has sides 50 and 52 rigidly mounted to the bottom surfaces 54 and 56 of the beams 18 and 20. A bottom plate 62 is joined between the sides 50 and 52. The bottom plate 62 preferably traverses the length of the guideway assembly 10. It has been found highly desirable to construct the bottom plate 62 of variable cross-sectional thickness. For example, at the support columns 11 the thickness of plate 62 may be one inch (2.54 cm) or more, whereas at the unsupported portions the plate thickness may be 0.38 inch (0.95 cm). The use of variable cross-sectional thickness for the bottom plate 62 has been found to be helpful in withstanding compressive stresses which are more pronounced at the locations where the truss 40 is supported upon the columns 11.

Vertical sides 50 and 52 of truss 40 cooperate with the bottom plate 62 to define a hollow interior space below running surfaces 36 and 38. Thus, in addition to providing a more lightweight assembly, the interior space may contain electrical conduit 107 (FIG. 3), or the like. Diaphragm plates 64 and tie bars 26 are welded or otherwise suitably secured within the interior of the truss 40 so as to be positioned above each column 11, providing additional strength and support. Apertures 108 are desirably formed in the diaphragm plates 64 to accommodate conduit 107 or such other desired power distribution channel as may be desired.

A cover plate 48 (see FIG. 2) is constructed to fit between running surfaces 36 and 38. The cover plate 48 may be easily removed by lifting the plate away from the tie bars 26, thereby permitting access to the interior space of the guideway assembly 10. The cover plate 48 may be welded between running surfaces 36 and 38 except at specified areas, which may be bolted in place in order to accommodate subsequent removal of the plate 48.

Figure 5:
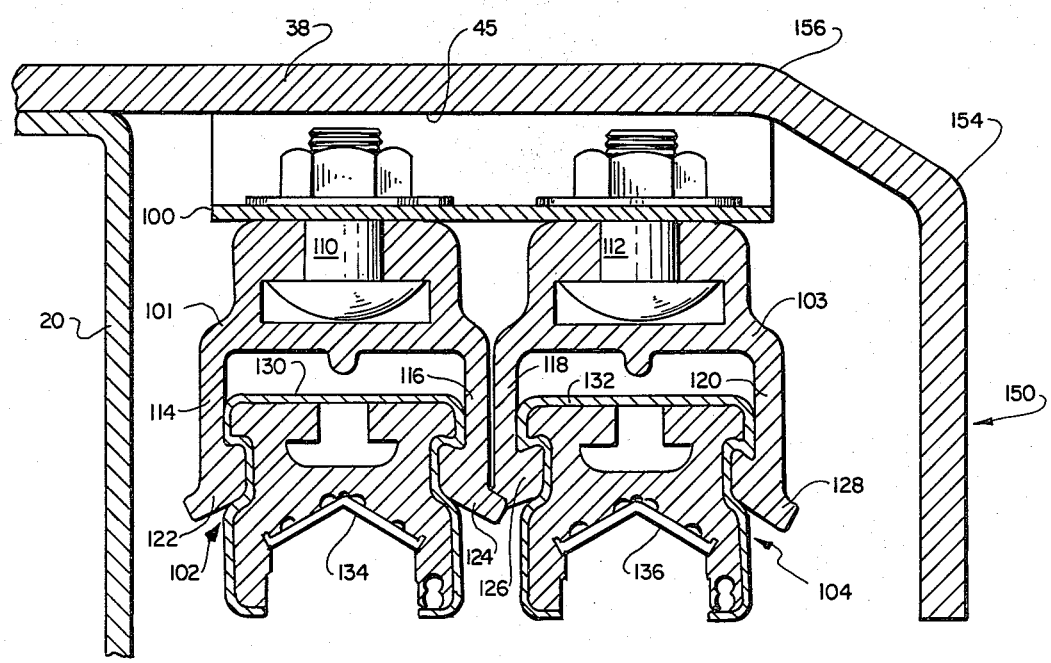
FIG. 5 is an enlarged cross-sectional view of the guideway assembly bus bars and protective skirt located on one side of the guideway assembly.

As shown best in FIGS. 4 and 5, a plurality of brackets such as shown at 100 and 105 are welded to the underside of running surface overhangs 43 and 45 at spaced locations. Each of the brackets 100 and 105 support a pair of bus bars 102–104 or 106–108. Three of the bus bars are used to carry power to the AGT vehicle (not shown) that runs along the guideway assembly. The fourth bus bar carries a control signal that is used by the AGT vehicle (not shown) to control its operation. The details of mounting and construction of bus bars 102 and 104 are shown best in FIG. 5. It will of course be understood that bus bars 106 and 108 are constructed and mounted to the guideway assembly 10 in a like manner.

As shown in FIG. 5, clamps 101 and 103 are mounted to the bracket 100 by bolts 110 and 112. The clamps 101 and 103 are typically constructed of resilient ceramic or plastic material, for purposes to be hereinafter more fully described. Also, as shown in FIG. 1 the clamps 101 and 103 are longitudinally offset since their overall width in relation to the width of bracket 100 (see FIG. 5) slightly overlaps. The downwardly depending arms 114, 116, 118 and 120 of clamps 101 and 103 are resilient and are adapted to be spread apart so that they may receive metal bus bars 102 and 104. Detents 122, 124, 126 and 128 provided at the ends of arms 114, 116, 118 and 120 lockingly engage the bus bars 102 and 104 in mating relationship as illustrated.

The body portion 130, 132 of bus bars 102 and 104 consists of extruded aluminum. The body portion 130, 132 is crimped onto a steel or copper plate contact surface 134, 136 shaped as an inverted "V". The power and/or control signal are carried by the contact surfaces 134, 136 to AGT vehicle-mounted collector brushes (not shown).

As shown best in FIGS. 4 and 5, protective skirts 150 and 152 are attached to the outer edges of running surface overhangs 43 and 45 along their entire length. The skirts 150 and 152 are bent as at 154 and 156 to form a smoothly curved shoulder. The curved shoulders help to prevent eddy currents and turbulence which occur when winds impact the side of the guideway assembly 10, and actually encourage laminar flow of transverse winds across the running surfaces 36 and 38, thus discouraging collection of ice or snow upon those surfaces. The lower ends of skirts 150 and 152 terminate generally at the lower ends of bus bars 102, 104, 106 and 108, thus shielding the guide wheel contact surface and bus bars against the weather, while still permitting the collector brushes of the AGT vehicle (not shown) to access the contact surfaces 134, 136 of the bus bars.

The guideway assembly described above is aesthetic in appearance and retains structural integrity thereby providing a safe and effective monorail track.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A monorail guideway assembly comprising:
 at least two elongated laterally spaced support members;
 means joining the parallel support members one to the other at spaced locations;

running surface means mounted upon each said support member, the width of said running surface means extending beyond the outer sides of the support members so as to form an overhang;

truss means for stabilizing and supporting said parallel support members;

one or more electrical bus bars secured beneath the overhang of each said running surface means; and skirt means attached to the outer edges of the overhang of each said running surface, said skirt means extending along the entire length of each said running surface overhang with the lowest edge of said skirt means terminating generally at the lower ends of said electrical bus bars so as to shield said bus bars from the weather.

2. A monorail guideway assembly as defined in claim 1 wherein said skirt means comprise a smoothly curved shoulder.

3. A monorail guideway assembly as defined in claim 1 wherein said skirt means overhangs sufficiently to shield a guide wheel contact surface.

4. A monorail guideway assembly as defined in claim 1 wherein said joining means comprise tie bars connecting the inner sides of said support members.

5. A monorail guideway assembly as defined in claim 1 additionally comprising a removable cover plate placed between said running surface means.

6. A monorail guideway assembly as defined in claim 1 wherein said truss means, said running surface means and said support members cooperate to define a hollow interior space of the guideway assembly.

7. A monorail guideway assembly as defined in claim 6 further comprising a plurality of diaphragm plates mounted inside the truss means, said diaphragm plates having openings therein to accommodate signal transmission therethrough.

8. A monorail guideway assembly which is suspendible upon support columns for supporting a vehicle having support wheels and control wheels, the monorail guideway assembly comprising:

a pair of laterally spaced and generally parallel support members, the outer sides of said support members comprising a running surface for said control wheels;

a plurality of tie bars joining the parallel support members one to the other at spaced locations;

running surface means mounted upon each parallel support member, said running surface means defining parallel tracks for said support wheels, and the width of said running surface means extending beyond the outer sides of the parallel support members so as to define overhangs on each side of the guideway assembly;

a removable cover plate placed between said parallel tracks and supported by said tie bars;

truss means mounted below said parallel support members and cooperating with said running surface means and support members to define a hollow interior space of the guideway assembly;

a plurality of diaphragm plates mounted inside said truss means;

a plurality of electrical bus bars secured beneath the overhang of each said running surface means; and skirt means attached to the outer edges of the overhang of each said running surface, said skirt means bending downward so as to form a smoothly curved shoulder.

9. A monorail guideway assembly as defined in claim 8 wherein said skirt means extend along the entire length of said running surface means, with the lowest edge of said skirt means terminating generally at the lowest end of said electrical bus bars.

* * * * *